United States Patent [19]

Kremer

[11] 4,077,875
[45] Mar. 7, 1978

[54] COLLODION BAG CONCENTRATION ACCELERATOR AND SAMPLER

[75] Inventor: Richard D. Kremer, Keene, N.H.

[73] Assignee: Carl Schleicher & Schull, Germany

[21] Appl. No.: 764,439

[22] Filed: Jan. 31, 1977

[51] Int. Cl.² .............................................. B01D 13/00
[52] U.S. Cl. .............................. 210/23 F; 210/321 R; 210/406
[58] Field of Search ............... 210/22, 23 F, 406, 456, 210/DIG. 23–DIG. 24, 321 R

[56] References Cited

U.S. PATENT DOCUMENTS

| | | | |
|---|---|---|---|
| 3,485,751 | 12/1969 | Herrmann et al. | 210/22 |
| 3,687,296 | 8/1972 | Spinosa et al. | 210/406 |
| 3,758,313 | 9/1973 | Scott | 210/22 |
| 3,761,408 | 9/1973 | Yoon Lee | 210/DIG. 23 |
| 3,956,125 | 5/1976 | Strutt | 210/406 |

Primary Examiner—Frank A. Spear
Assistant Examiner—E. Rollins Cross
Attorney, Agent, or Firm—Weingarten, Maxham & Schurgin

[57] ABSTRACT

Ultrafiltration apparatus employing collodion bag dialyzing means. This apparatus provides a means for accelerating the dialysis process and a cooperative means for obtaining samples of the concentrate from the collodion bag. A displacement body with an axial bore is attached to a tube and positioned within the collodion bag. By displacing fluid volume in the bag, the speed of dialysis is increased. The combination of the tube and displacement body also facilitates removal of samples of the concentrated fluid from the bag.

12 Claims, 4 Drawing Figures

Fig. 1.

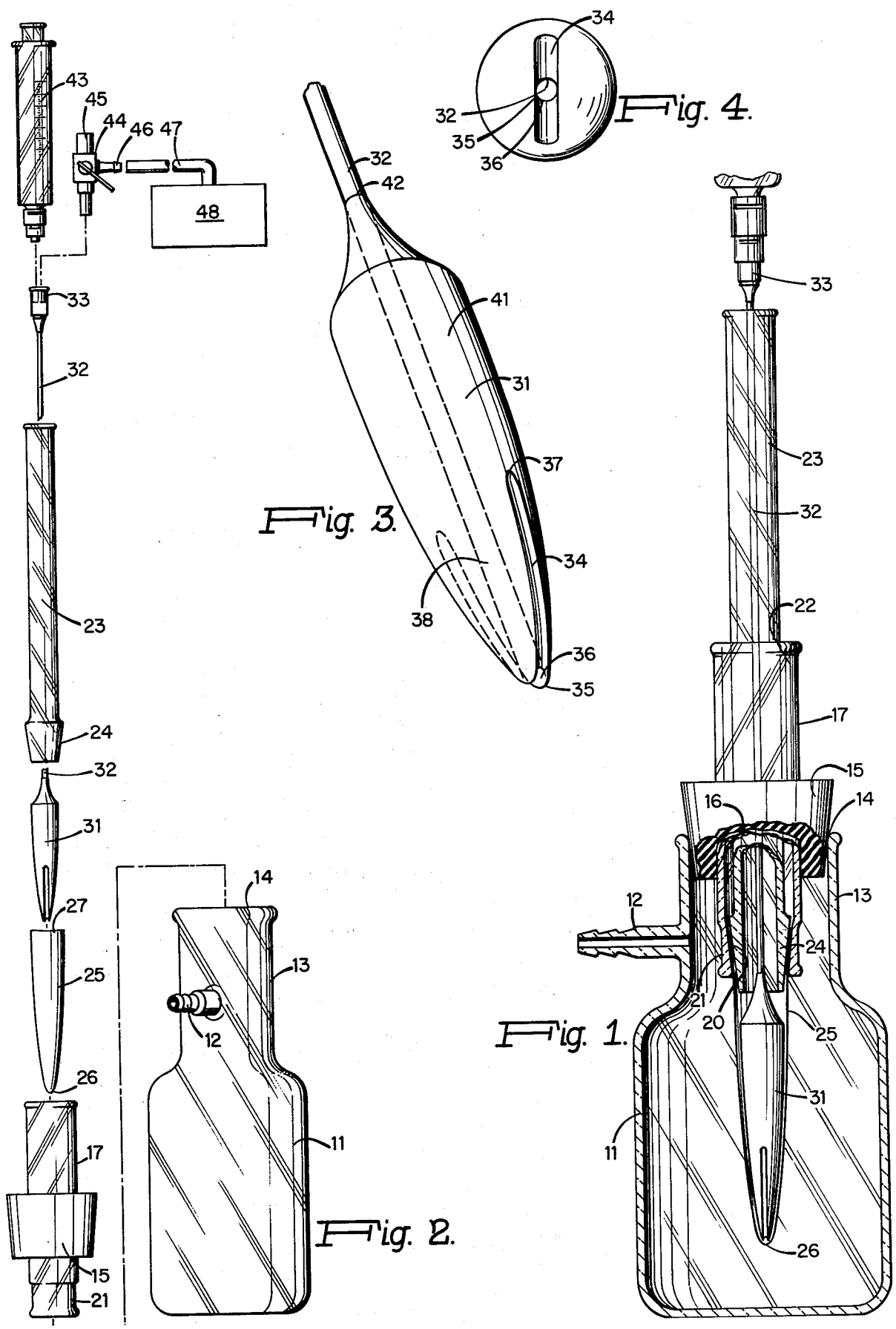

COLLODION BAG CONCENTRATION ACCELERATOR AND SAMPLER

FIELD OF THE INVENTION

This invention relates generally to medical diagnostic apparatus and more particularly to a device for accelerating the protein concentration of body fluids and removal of samples therefrom for further tests.

BACKGROUND OF THE INVENTION

The particular proteins and the concentration thereof in body fluids such as ascites fluid, spinal fluid and urine, may indicate a particular pathological condition. For diagnostic purposes, it is desirable to separate the proteins from the fluids to some extent, that is, to obtain a fluid having a substantially higher concentration of the proteins, to facilitate subsequent analysis through procedures such as electrophoresis and gel chromatography. Collodion bags have previously been used for dialyzing the body fluid to obtain the desired concentration but as the amount of the fluid in the bag is reduced during the dialysis procedure, the bag surface area in contact with the fluid decreases. This results in a reduction of the speed of dialysis and reduced efficiency of the bag membrane. Furthermore, presently available means for removal of samples of the concentrated fluid from the collodion bag have certain drawbacks, among which are: the need for a separate pipetting or fluid withdrawal system; the use of narrow bore pipette tips can damage the collodion bag; a potential hazard to the operator if mouth pipetting is employed, a common laboratory practice. Additionally, Pasteur pipettes which are normally employed for such purposes are fragile and can easily be broken off in the apparatus.

For reference purposes, collodion bags are small porosity membranes formed to separate out proteins of different molecular sizes from the fluids in which they reside. Collodion bags may be used to separate out molecules having a size down to as low as 10,000 molecular weight. The bag itself is formed of cellulose nitrate which forms the membrane, the substance of the membrane generally being referred to by the term collodion. The membrane is, in effect, a fine orifice lattice structure used for mechanical filtration of molecules from fluids in which the molecules are carried or suspended.

SUMMARY OF THE INVENTION

Broadly speaking, this invention is concerned with a collodion bag ultrafiltration concentrator having means for increasing the amount of surface area contact of small liquid samples with the membrane surface of the collodion bag thus accelerating the dialysis action or rate of diffusion through the bag wall, and means to facilitate taking samples of the concentrated fluid from within the bag at any time. Specifically, the invention comprises a displacement body which occupies a significant portion of the interior volume of the bag. The displacement body is so formed as to permit the fluid being dialyzed in the bag to remain in contact with substantially the entire inner surface of the bag until only a very small concentrated amount of the fluid remains in the bag. By maintaining the fluid in contact with a relatively large portion of the bag surface, the speed of dialysis is significantly increased. A rigid steel tube extends through the longitudinal axis of the body and is used both for inserting further samples of fluid and for removing samples to determine the concentration of the fluid in the bag.

The apparatus includes further structure for facilitating the application of larger fluid samples to the collodion bag and removal of samples of concentrated fluid therefrom for further testing. Such structure includes a syringe coupled to the tube, and a syphon setup to accommodate relatively large volume samples. Such large samples may be necessary where the concentration of the substance to be tested is quite low.

BRIEF DESCRIPTION OF THE DRAWING

The objects, features and advantages of this invention will be readily appreciated from the following detailed description when taken in conjunction with the accompanying drawing in which:

FIG. 1 is a partially broken away sectional view of the ultrafiltration apparatus of this invention;

FIG. 2 is an exploded view of the apparatus of the invention shown in FIG. 1;

FIG. 3 is an enlarged perspective view of the displacement body of the invention; and FIG. 4 is an end view of the displacement body of FIG. 3.

DETAILED DESCRIPTION OF THE PREFERRED EMBODIMENT

With reference now to the drawing, and more particularly to FIGS. 1 and 2 thereof, there is shown a container 11 having a side arm male connector 12 attached to the neck 13 thereof, and a top opening 14. Positioned in opening 14 is a stopper 15 having an axial bore 16 therethrough, in which resides cylindrical outer sleeve 17. The sleeve is formed with a slightly tapered female fitting 20 inside end 21 and an open upper end 22. Within sleeve 17 is inner sleeve 23 having a male fitting 24 at one end adapted to mate with the female fitting of sleeve 17. Mounted on end 24 of sleeve 23 is collodion bag 25 having a closed end 26 and an open end 27, the material of the bag in the vicinity of the open end being sandwiched between the male and female ends of sleeves 23 and 17 respectively. Disposed within bag 25 is displacement body 31 attached to the end of a substantially rigid hollow tube 32, the tube having a fitting 33 at the upper end thereof. Fittings 20 and 24 are shown as matching frusto-conical elements but other shapes may be used to accomplish the purpose.

Collodion bag 25 has a nominal capacity of approximately 8 ml but displacement body 31 occupies a substantial portion of the interior volume of the bag, preferably about 6 ml of that volume. A sample of the fluid to be diagnosed may range in volume typically from 2 to 10 ml. With displacement body 31 residing within collodion bag 25, as little as 2 ml of fluid will substantially fill the space between body 31 and the interior dialyzing surface of the bag, any remaining sample being displaced within inner sleeve 23 at the beginning of the procedure. Thus, whether 2 or 10 ml are initially used, and when the total amount of fluid remaining to be dialyzed through the dialyzing surface of the bag is reduced to as little as 2 ml, the bag effectively remains substantially full and the fluid is in contact with most of the inner surface area thereof. This substantially improves the speed and efficiency of the operation of the collodion bag throughout the dialyzing procedure as fluid passes through the surface of the bag into container 11 leaving increased concentration of macromolecular materials such as proteins within the bag itself.

With reference now to FIG. 3, the tapered displacement body is shown having two diametrically opposed surface grooves 34 which meet at tip 35 forming a diametrical groove 36 across the tip. The displacement body is formed around the distal end of tube 32, the tube normally extending to the end 35 of the body. When the grooves 34 and 36 are milled or machined, the end of tube 32 is likewise machined to define part of diametrical groove 36. Groove 34 has a depth of approximately 1.5 mm at tip 35 and tapers to a depth of 0 mm at point 37. The end 37 of groove 34 substantially corresponds to a transition between portion 38 of maximum taper of the displacement body, and upper body portion 41 of lesser taper. For reference purposes, the displacement body is formed of inert plastic material, preferably polypropylene which can be made relatively hard and can be machined. As an example, with an 8 ml bag 25, body 31 will be approximately 80 mm long to the point 42 where it tapers smoothly to the surface of tube 32, and the slots 34 extend approximately 25 mm up the side of the body from the narrowly rounded tip. Although two grooves 34 have been found to be sufficient, more than two may be used if desired.

As shown in FIG. 1, tip 35 rests on the inside bottom 26 of bag 25 and the sides of the bag fit loosely around the surface of body 31. Because of the pressure exerted by the fluid in the bag, a slight separation between the interior surface of the bag and the surface of the body will normally be maintained during dialysis. Slots 34 and 36 permit ready access of the fluid to the interior bore of body 31 whether the fluid is applied through tube 32 into the bag or withdrawn from the bag through the tube. When fluid is withdrawn for test purposes to determine the concentration of the fluid in the bag, the fluid is allowed to run down to the tip of body 31 through slots 34 even if the surface of the bag should happen to contact the lower portion of the body in the general vicinity of the slots.

In order to facilitate diffusion of liquid through the wall of bag 25, a vacuum means (not shown) may be coupled to male fitting 12 on the neck of the container. Due to the pressure differential of the fluid in the collodion bag and the atmosphere in the container surrounding the bag, fluid is encouraged to diffuse more rapidly through the wall of the bag.

Fitting 33 at the top of tube 32 may be of any desirable type such as those known and sold under the trademark Luer-Lok. In order to withdraw a sample from bag 25, a syringe 43 is attached to fitting 33 and the piston of the syringe is withdrawn creating a partial vacuum in tube 32 thereby drawing fluid from bag 25 up into the barrel of the syringe. When a desired amount of the concentrated fluid sample is drawn into the syringe, the syringe is disconnected from fitting 33 and the fluid may then be taken to another location for further testing.

If it is desired to expand the sample capacity of the dialysis apparatus shown in FIG. 1, the capacity of the bag and upper tube together being approximately 24 ml, a three-way valve 44 (FIG. 2) is attached to fitting 33. Fitting 45 is connected to syringe 43 and connector 46 is coupled to a flexible tube 47 which leads to an exterior reservoir 48 of the fluid being tested. This sets up a siphoning arrangement which is started by connecting the syringe to the reservoir through the valve so that a portion of the sample can be withdrawn from the reservoir into the barrel of the syringe. The valve is then closed to the reservoir and opened to tube 32 so that the fluid may be injected into bag 25 and sleeve 23. Thereupon the valve is closed to the syringe and opened between the reservoir and tube 32, thus establishing a continuous fluid connection between the reservoir and the collodion bag. By maintaining the collodion bag below the level of the fluid reservoir, a siphon arrangement is maintained and continuous dialysis through the wall of the collodion bag is achieved. In this particular arrangement, the displacement body is not initially needed to facilitate speed of dialysis of the fluid in the bag but it provides the necessary apparatus to permit easy withdrawal of samples from the bag for testing purposes.

It may be noted that if the displacement body were not attached to the end of tube 32, insertion of the tube to withdraw a sample could very easily puncture the collodion bag and ruin the entire procedure. Thus it is apparent that body 31 enhances the speed and efficiency of dialysis in the collodion bag as well as facilitating removal of samples of the concentrated fluid from the bag.

By way of example and without limiting the structure to certain materials, container 11 and sleeves 17 and 23 are normally made of glass while tube 32 is normally made of stainless steel. Other appropriate inert substances could be used as desired.

In view of the above description, it is likely that modifications and improvements will occur to those skilled in the art which are within the scope of this invention.

What is claimed is:

1. An ultrafiltration apparatus for fluids, said apparatus comprising:
    a container having an opening at the top thereof;
    an open ended inner sleeve;
    means for mounting said inner sleeve within said opening;
    a collodion bag mounted on and having a closed end depending from the end of said inner sleeve within said container;
    a tube extending longitudinally through said sleeve; and
    a displacement body mounted on the distal end of said tube and occupying a substantial portion of the interior volume of said bag, said body having an axial bore therethrough and having a diameter less than the inner diameter of said bag, the fluid being contained within said bag for diffusion through the wall of said bag.

2. The ultrafiltration apparatus recited in claim 1 wherein said body is formed with at least two longitudinal surface grooves extending from the distal end thereof and communicating with said axial bore.

3. The ultrafiltration apparatus recited in claim 1 wherein said body is shaped and configured to conform generally to the shape of the interior of said bag.

4. The ultrafiltration apparatus recited in claim 2 and further comprising a fitting at the proximate end of said tube adapted for connection to additional members.

5. The ultrafiltration apparatus recited in claim 4 and further comprising a syringe coupled to said tube by means of said fitting, said syringe being adapted to inject fluid into said bag and to remove concentrated samples of fluid therefrom.

6. The ultrafiltration apparatus recited in claim 1 wherein said container is formed with a connector adjacent the opening thereof, said connector opening into the interior of said container and being adapted to be connected to vacuum producing means to thereby create a pressure differential on opposite sides of the wall of said bag to facilitate diffusion of fluid therethrough.

7. The ultrafiltration apparatus recited in claim 4 and further comprising:
   a three-way valve coupled to said tube by means of said fitting; and
   a syringe coupled to said valve;
   said valve being adapted to be coupled to a reservoir of the fluid to be tested thereby selectively connecting said reservoir to the interior of said bag.

8. The ultrafiltration apparatus recited in claim 1 wherein said mounting means comprises:
   a resilient stopper having a bore therethrough; and
   an outer sleeve having a female coupling at one end;
   the open end of said bag being sandwiched between the distal end of said inner sleeve and the mating female connection of said outer sleeve, said inner sleeve extending through said outer sleeve.

9. The ultrafiltration apparatus recited in claim 8 whereby said stopper provides a substantially airtight fit between said outer sleeve and said opening in said container.

10. The ultrafiltration apparatus recited in claim 9 wherein said distal end of said inner sleeve and said female coupling of said outer sleeve are formed as matching frusto-conical male and female fittings respectively.

11. A method for ultrafiltration of fluids by means of a collodion bag depending from the end of an inner sleeve suspended within a container, the fluid being contained within said bag, said method comprising the steps of:
   displacing a substantial portion of the interior volume of said bag by means of a displacement body disposed therein, said body being shaped and configured to substantially conform to the interior contour of said bag and having an elongated tube extending from said displacement body to a point external to said container;
   periodically withdrawing samples of concentrated fluid from within said bag through said tube, said tube extending coaxially through said body, the bore thereof communicating with the interior of said bag;
   whereby the fluid, in small volume, remains in contact with a large portion of the inside dialyzing surface of said bag.

12. The method recited in claim 11 and comprising the further step of injecting fluid through said tube into said bag.

* * * * *